US006868612B2

United States Patent
Ballard

(10) Patent No.: US 6,868,612 B2
(45) Date of Patent: Mar. 22, 2005

(54) CUTTING GUIDE DEVICE FOR CIRCULAR SAWS

(76) Inventor: Willard E. Ballard, 128 Holston View Dr., Elizabethton, TN (US) 37643

( * ) Notice: Subject to any disclaimer, the term of this patent is extended or adjusted under 35 U.S.C. 154(b) by 0 days.

(21) Appl. No.: 10/622,599

(22) Filed: Jul. 18, 2003

(65) Prior Publication Data
US 2005/0011077 A1 Jan. 20, 2005

(51) Int. Cl.⁷ .............................. B27B 5/20; B26D 5/00
(52) U.S. Cl. .......................... 30/371; 30/375; 83/468; 83/829
(58) Field of Search .................... 30/371, 374, 375, 30/373, 505, 376, 391, 390, 388; 83/487, 761, 762, 765, 445, 486.1, 829, 468, 781, 441.1, 574, 821, 471.2–477.1, 745, 871.3

(56) References Cited

U.S. PATENT DOCUMENTS

| | | | | |
|---|---|---|---|---|
| 2,599,893 A | * | 6/1952 | Butler | 83/464 |
| 3,344,824 A | * | 10/1967 | Greco | 30/374 |
| 3,602,987 A | * | 9/1971 | Miller | 30/273 |
| 3,991,643 A | * | 11/1976 | Girardin | 83/564 |
| 4,078,309 A | * | 3/1978 | Wilson | 30/375 |
| 4,202,233 A | * | 5/1980 | Larson | 83/745 |
| 4,335,512 A | * | 6/1982 | Sheps et al. | 30/376 |
| 4,355,557 A | * | 10/1982 | Mecsey | 83/565 |
| 4,452,117 A | * | 6/1984 | Brickner et al. | 83/468 |
| 4,519,280 A | * | 5/1985 | Cook | 83/34 |
| 4,522,098 A | * | 6/1985 | Bliss | 83/745 |
| 4,552,192 A | * | 11/1985 | Eaves | 144/136.95 |
| 4,576,076 A | * | 3/1986 | Pyle | 83/471.3 |
| 4,751,865 A | * | 6/1988 | Buckalew | 83/745 |
| D310,375 S | * | 9/1990 | Brickner et al. | D15/133 |
| 5,035,061 A | * | 7/1991 | Bradbury et al. | 33/430 |
| 5,472,029 A | * | 12/1995 | Ketch | 144/371 |
| 6,212,983 B1 | * | 4/2001 | Pyle | 83/34 |
| 2002/0000046 A1 | * | 1/2002 | Hartmann | 30/376 |
| 2003/0233926 A1 | * | 12/2003 | Makropoulos | 83/829 |

* cited by examiner

Primary Examiner—Allan N. Shoap
Assistant Examiner—Ghassem Alie

(57) ABSTRACT

A guide device for a hand held circular saw having a base, the device having a platform on which the base of a hand held circular saw can rest, wherein cooperating shoulders on the platform and saw base provide a guide for cutting on a straight line through a workpiece, wherein elevation flanges are provided on the sides of the platform and are provided with mounting structure which is operable to fix the platform to a supporting structure at a desired height above the workpiece, and wherein angle adjustment structure is provided on the elevation flanges for a fixing the angle of the platform and saw base with respect to the surface of the workpiece.

16 Claims, 2 Drawing Sheets

CUTTING GUIDE DEVICE FOR CIRCULAR SAWS

BACKGROUND OF THE INVENTION

1. Field

This invention concerns a guide device which is constructed to be affixed to any supporting structure including a workpiece itself and to the base of a hand held circular saw and which is readily adjustable to guide the saw accurately and comfortably, with one hand, to cut the workpiece of substantially any width at any of a wide degree of angles both through the plane of the workpiece and across the workpiece.

2. Prior Art

Heretofore cutting guide devices typically have been quite complex in structure, particularly for hand held circular saws, and generally have been concerned with guiding the saw blade through the workpiece with the cut at various angles across the workpiece. These devices have not, in themselves, provided for cuts which are other than 90° to the plane of the workpiece since hand held circular saws already are provided with means for adjusting the angle of the blade from 90° to about 45° with respect to the plane of the saw base, and hence with respect to the plane of the workpiece.

This conventional angle range, however, is insufficient for many construction purposes. Also, when guiding the saw across the workpiece, particularly across a wide workpiece such as the 4 ft. or 8 ft. dimension of plywood, and particularly where the saw blade is angled from 90° to the workpiece plane, the counter force on the blade can easily move the saw off line.

SUMMARY OF THE INVENTION

The present invention provides a guide device which is inexpensive, simple and lightweight in construction, is easy to use, and in a broad structural embodiment comprises a platform means on which the base of a hand held circular saw can rest, wherein cooperating shoulder means on the platform means and saw base provide a guide for cutting on a straight line through a workpiece, wherein elevation means is provided on the platform means and is provided with mounting means which is operable to fix the platform means to a supporting structure at a desired height above the supporting structure, and wherein angle adjustment means is provided on the elevation means for fixing the angle of the platform means and saw base with respect to the plane of the workpiece.

It is particularly noted that the present device wherein larger circular saws are used, such as 10 in. blade, the angle of cut which is afforded through the combination of the conventional angle setter of such saws and the present guide is very large, e.g., 70°–80° or so from the 90° vertical cut.

BRIEF DESCRIPTION OF THE DRAWINGS

The invention and its objects and advantages will be understood further from the description and drawings herein, wherein the various figures are not drawn to scale or relative proportions and are intended principally to illustrate the present inventive concepts, and wherein.

DETAILED DESCRIPTION

Figure 1:
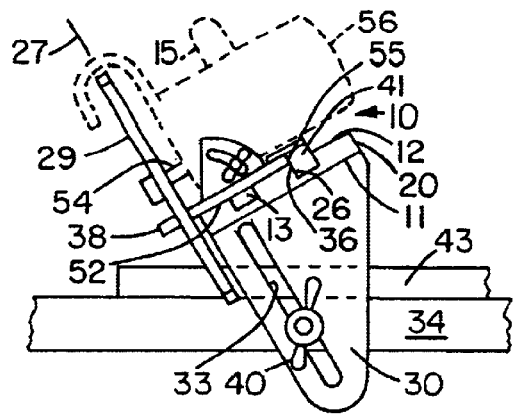
FIG. 1 is a front view of the present guide device supporting a hand held circular saw above a workpiece with the platform means and saw blade oriented at a tip angle of about 50° to the plane of the workpiece solely by the present elevation means.
Figure 2:
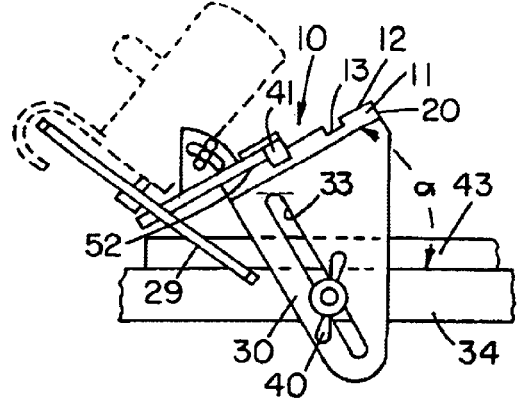
FIG. 2 is a view as in FIG. 1 with the tip angle at about 35° by use of the conventional angle setter of a hand held circular saw in combination with the present elevation means set at the 50° tip angle of FIG. 1.
Figure 3:
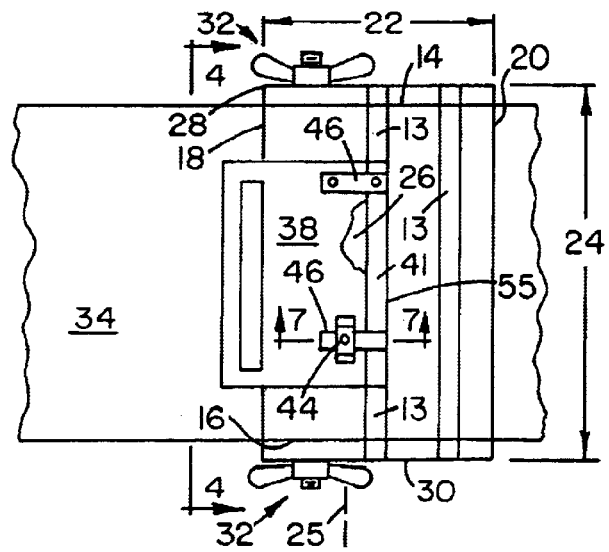
FIG. 3 is a top down view of FIG. 1 with the saw motor and blade removed from the saw base and with structural portions broken away for clarity.
Figure 4:
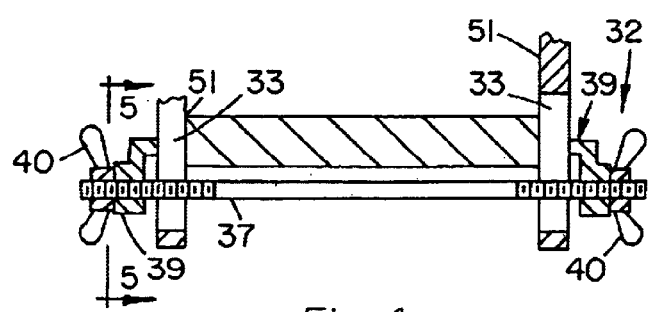
FIG. 4 is a view taken along line 4—4 in FIG. 3 and showing a variation in the mounting means for the guide device.

Referring to the drawings and with particular reference to the claims herein, the present guide device which can be of any material such as, for example, wood, plastic or aluminum, comprises the platform means generally designated (10) having a top portion (11) with a substantially planar top surface (12), opposed sides (14),(16) and opposed front (18) and back (20) ends and having a longitudinal dimension (22) and a lateral dimension (24). This lateral dimension comprises a lateral axis generally designated (25) which extends laterally of the platform means at any point along the longitudinal dimension of the platform means. In use, when the circular saw is mounted on the platform, it will be apparent that the plane (27) of the saw blade (29) is always oriented parallel to the lateral axis (25).

A first guide shoulder means (26) is provided on the platform means and extends along the lateral axis (25) and downwardly from the top surface (12). Should means (26) comprises one or more slots (13) formed through the surface (12) along the lateral axis (25). Multiple slots (13) will accommodate a variety of saw base dimensions. The depth of the slots can be varied, depending on the thickness of top the portion (11), but it is preferred to have a depth of at least about 0.25 in. such that the second guide shoulder means (hereinafter described) on the saw base cannot be dislodged easily from said slot (13) by the normal pushing action of the operator against the saw handle (15). It is noted that the shoulder means (26) can also comprise the back end (20) of the platform means.

Figure 6:
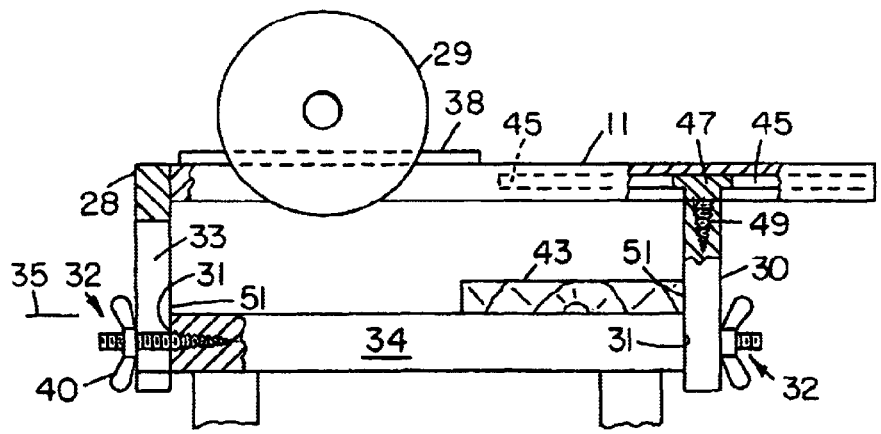
FIG. 6 is a partially cross-sectioned view taken generally along line 4—4 in FIG. 3 and showing a width adjustment structure for the guide device.

The platform means (10) has a pair of longitudinally spaced cooperating elevation flanges (28),(30) extending downwardly from the top portion (11) and which are provided with clamping means generally designated (32) for affixing the device to the supporting structure (34). The flat inner surface (51) of said flanges serve as guides for the workpieces (43) as shown in FIG. 6.

Figure 10:
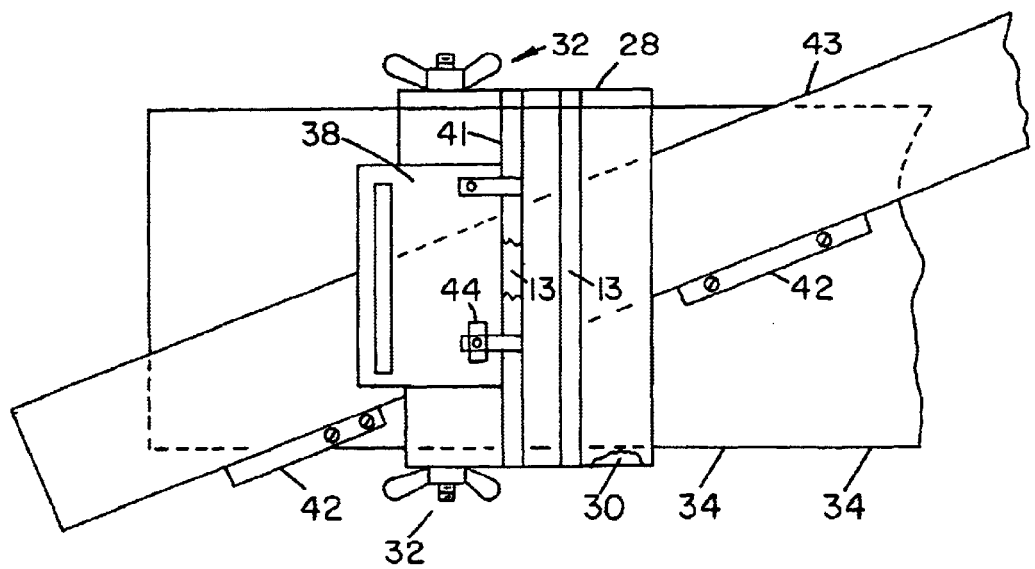
FIG. 10 is a view as in FIG. 3 showing a workpiece set up for an angular cut across the workpiece.

In use, the first guide shoulder means (26) is normally oriented laterally of the workpiece or other supporting structure (34) but may be angled across the workpiece as shown as (43) in FIG. 10 along with the rest of the device and the saw mounted thereon such that, e.g., compound angled cuts can be made through the workpiece. For this embodiment, suitable guide fences such as (42) may be temporarily fixed to the supporting structure (34) such as an elongated work bench or saw table. The top portion (11) can be set at a prescribed height above and at a prescribed angle α to the plane (35) of the supporting structure by way of the clamping means (32) tightened through slots (33) formed through end flange (28),(30) against the edges of the supporting structure (34). The first guide shoulder means (26) is adapted to engage second guide shoulder means (36) on the base (38) of the saw for guiding the saw in a straight line generally laterally or at an angle across the workpiece.

The clamping means structure (32) can be widely varied and includes, for example, screws or the equivalent mounted through the slots (33) and screwed into the edge portions (31) of the supporting structure, or threaded rods (37) with clamp member (39) and wing nuts (40), or simply any of a large variety of speed clamps or the like which are readily available in varying lengths.

Figure 7:
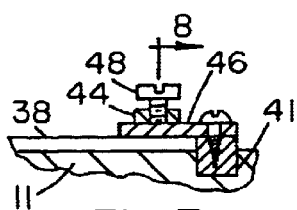
FIG. 7 is a cross-sectional view of the attachment means for the guide bar taken along line 7—7 in FIG. 3.
Figure 8:
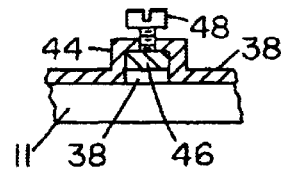
FIG. 8 is a cross-sectional view taken along line 8—8 in FIG. 7.

The second guide shoulder means (36) is preferably provided by a slide bar (41) adapted to slidably fit into the slots (13), preferably with less than about 0.04 in. side clearance to minimize sideways runout of the saw blade. This bar can be affixed to the saw base (38) in any convenient and removable manner and includes the conventional guide attachment means provided on most hand held circular saws and shown in FIGS. 7 and 8. Such attachment means comprises a cut-out raised portion (44) on the saw base (38) through which an arm member (46) is affixed at one end of the slide bar (41) by screws or the like and at its other end is affixed to the saw base by tightening a set screw (48), which is threaded through the portion (44), against the upper surface of the arm member (46).

The type of circular saw to which the present invention is a applicable is a convention one as shown in the drawings as comprising a base (38) having a planar slide surface (52) and having a disc shaped cutting blade (29) mounted on a drive shaft (54) of an electric motor (56) and lying in a variable cutting plane (27), wherein the motor, with of course said blade attached, is pivotally mounted on the base for angular adjustment with respect to the base to orient cutting plane (27) with respect to the slide surface (52) at an angle of between about 90° and about 45°. In order to adapt the saw for use in the present invention the slide bar (41) is removably affixed to the saw base along the back edge (55) thereof as described above.

Figure 9:
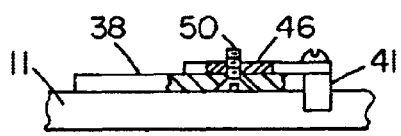
FIG. 9 is a view as in FIG. 7 showing a variation in the guide bar attachment means.

A variation of the attachment means is shown in FIG. 9 wherein a screw of bolt (50) is countersunk in the underside of the saw base (38) and is mounted through arm member (46) for tightening (46) against the base (38) and holding the bar (41) in place on the base.

Figure 5:
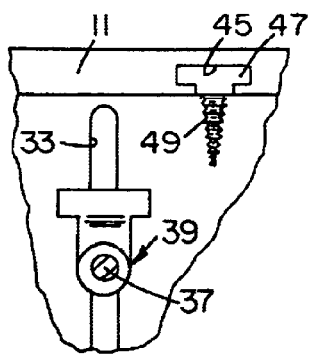
FIG. 5 is an end view of a portion of the platform and elevation means taken along line 5—5 in FIG. 4.

Referring to FIGS. 5 and 6, the present device is provided with a width adjustment means longitudinally spaced on one of the elevation flanges and operable for accommodating different width supporting structures. The adjustment means comprises a T shaped slot (45) formed in the top portion (11) along the lateral axis (25), through which a complementary follower (47) is slidable. This follower is affixed to the top of the elevation flange by a threaded stud (49) or the equivalent. This flange is thus movable laterally toward or away from the opposite flange to accommodate a particular width of the supporting structure. With such width adjustment means, the present device is adaptable for mounting on narrow saw tables used, for example, for cutting planks or the like, or on wide tables used for cutting wide workpieces such as sheets of plywood.

This invention has been described in detail with particular reference to preferred embodiments thereof, but it will be understood that variations and modifications will be affected within the spirit and scope of the invention.

I claim:

1. The combination of a cutting guide device and a conventional type hand held circular saw, wherein said saw comprises a base (38) having a planar slide surface (52) and a back edge (55) and having a disc shaped cutting blade (29) mounted on the drive shaft (54) of an electric motor (56) and lying in a variable cutting plane (27), wherein a mounting structure is provided on the saw motor for pivotally mounting the motor on said base for angular adjustment with respect to said base to orient said cutting plane (27) with respect to said slide surface at an angle of between about 90° and about 45°, wherein said saw base is provided with a second guide shoulder means (41) aligned substantially parallel to said cutting plane (27) and having a portion extending below said slide surface, and wherein said device comprises a platform structure generally designated (10) having a top portion (11) providing a substantially planar top surface (12) on which said slide surface (52) can rest and slide, said platform structure further having a longitudinal dimension (22) and a lateral dimension (24), first guide shoulder means (26) on said platform means and extending downwardly from said top surface (12) and along said lateral dimension (24), a pair of laterally spaced cooperating elevation flanges (28), (30) affixed to and extending downwardly from said top portion (11), a clamping mechanism (32) on said device adapted to releasably affix said platform structure to opposing edge portions (31) of a supporting structure (34) at a prescribed height thereabove and at a prescribed angle α with respect to said supporting structure, whereby the combination of the conventional angle setter of and the α angle adjustment structure of the guide device allows an angle cut of up to about 80° from the vertical, wherein said first guide should means (26) on said platform structure is adapted to engage said second guide shoulder means (36) on said base (38) for guiding said saw in a straight line laterally across said supporting structure.

2. The combination of claim 1 wherein said supporting structure is an elongated work piece.

3. The combination of claim 1 wherein said prescribed height provides a vertical opening between said top portion and said supporting structure through which an elongated workpiece is adapted to slide and be supported by said supporting structure.

4. The combination of claim 1 wherein said top portion and at least one of said flanges are provided with cooperating structural elements of a lateral adjustment structure for allowing the distance between said flanges to be adjusted on said top portion laterally thereof to accommodate workpieces or supporting structures of different widths.

5. The combination of claim 1 wherein said mounting means comprises a height adjustment slot oriented through each said flange substantially normal to the plane of said top surface, and wherein fastener means is mounted through said slots and into said supporting structure and adapted to tighten said flanges against edge portions of said supporting structure.

6. The combination of claim 3 wherein inside surface portions (51) of said flanges provide slide guides for assisting in keeping said workpiece properly oriented with respect to said first guide shoulder means.

7. The combination of claim 1 wherein said first guide shoulder means comprises the forward side (26) of at least one lateral slot (13) formed laterally through said upper surface and part way through said top portion 11.

8. The combination of claim 7 wherein said top portion (11) has a back end (20) lying along a lateral axis (25) and wherein said first guide shoulder means is provided by said back end of said platform means.

9. The combination of claim 7 wherein a slide member (41) is provided and dimensioned in cross-section to accurately fit into and readily slide within said slot (13), and wherein cooperating elements of fastening means are provided on said slide member and on said saw base of a hand held circular saw for securing said slide member to the saw base along a lateral back edge (55) of said base.

10. The device of claim 4 wherein said lateral adjustment structure comprises a T shaped slot (45) formed in the bottom of said top portion along the lateral axis (25), through which slot a complementary shaped follower (47) affixed to said flange is slidable.

11. The device of claim 1 wherein each said flange has a flat inner surface (51) which bears against a said edge portion (31) of said supporting structure, wherein a slot (33) is formed laterally through each said flange, wherein a threaded stud (49) is screwed laterally into each said edge portion, wherein said stud has a threaded portion extending outwardly through a said slot, and wherein a nut structure is threaded onto each said threaded portion and, when tightened, bears against an outer surface of its associated flange and compresses the flange against a said edge portion, and wherein when said nut structures are loosened, said flanges are allowed to pivot around said stud and said flanges are allowed to slide up and down with respect to said stud for adjusting the height of said top portion above said supporting structure and for adjusting the angle $\alpha$.

12. The combination of claim 9 wherein said slide member and said slot (13) have substantially rectangular complementary cross sections whereby longitudinal motion in either direction of said saw base during cutting is substantially prevented.

13. A cutting guide device for use with a conventional type hand held circular saw, wherein said saw has a base (38) having a planar slide surface (52) and a back edge (55) and having a disc shaped cutting blade (29) mounted on a drive shaft (54) of an electric motor (56) and lying in a variable cutting plane (27), wherein the motor is pivotally mounted on the base for angular adjustment with respect to the base to orient the cutting plane (27) with respect to the slide surface at an angle of between about 90° and about 45°, and wherein the saw base is provided with a second guide shoulder (41) aligned substantially parallel to the cutting plane (27) and having a portion extending below the slide surface, wherein said device comprises a platform structure generally designated (10) having a top portion (11) providing a substantially planar top surface (12) on which the slide surface (52) can rest and slide, said platform structure further having a longitudinal dimension (22) and a lateral dimension (24), first guide shoulder means (26) on said platform means and extending downwardly from said top surface (12) and along said lateral dimension (24), a pair of laterally spaced cooperating elevation flanges (28), (30) affixed to and extending downwardly from said top portion (11), a clamping mechanism (32) on said device adapted to releaseably affix said platform structure to opposing edge portions (31) of a supporting structure (34) at a prescribed height thereabove and at a prescribed angle $\alpha$ with respect to said supporting structure, whereby said first guide shoulder means (26) on said platform structure is adapted to engage the second guide shoulder (36) on the base (38) for guiding the saw in a straight line laterally across said supporting structure.

14. The device of claim 13 wherein each said flange has a flat inner surface (51) which bears against a said edge portion (31) of said supporting structure, wherein a slot (33) is formed laterally through each said flange, wherein a threaded stud (49) is screwed laterally into each said edge portion, wherein each stud has a threaded portion extending outwardly through a said slot, and wherein a nut structure is threaded onto each said threaded portion and, when tightened, bears against an outer surface of its associated flange and compresses the flange against a said edge portion, and wherein when said nut structures are loosened, said flanges are allowed to pivot around said stud and said flanges are allowed to slide up and down with respect to said stud for adjusting the height of said top portion above said supporting structure and for adjusting the angle $\alpha$.

15. The device of claim 13 wherein said first guide shoulder means comprises the forward side (26) of at least one lateral slot formed laterally through said upper surface and part way through said top portion 11.

16. The device of claim 13 wherein said top portion (11) has a back end (20) lying along a lateral axis (25) and wherein said first guide shoulder means is provided by said back end of said platform means.

\* \* \* \* \*